April 14, 1964

B. A. CASH 3,128,912

METERING DEVICE FOR MOLTEN METAL

Filed March 8, 1963

INVENTOR.
BURNS A. CASH
BY [signature]
ATTORNEY

INVENTOR.
BURNS A. CASH
BY Wade Koontz

ATTORNEYS

United States Patent Office 3,128,912
Patented Apr. 14, 1964

3,128,912
METERING DEVICE FOR MOLTEN METAL
Burns A. Cash, Madison, Wis., assignor to the United States of America as represented by the Secretary of the Air Force
Filed Mar. 8, 1963, Ser. No. 264,006
6 Claims. (Cl. 222—52)

This invention relates to a positive displacement device for metering molten metal, and more particularly to a piston and cylindrical container for metering quantities of molten metal wherein a partial vacuum or "balancing" pressure is automatically maintained above the piston to prevent leakage of air past the piston into the molten metal being metered, thereby to reduce oxidation and increase the accuracy of the metering measurement.

Cast iron and certain corrosion-resistant steels may be used for constructing pumps for pumping, or metering molten metals such as aluminum, but the destruction of such materials by corrosive and erosive action of the molten metals render them undesirable for use in apparatus which is to be employed in any but the most intermittent operations.

More suitable metals comprise ceramic compositions such as boron nitride or silicon nitride bonded to silicon carbide. Such metals have long, useful lives, but suffer the disadvantage that they cannot be machined, and cannot be cast to close dimensional tolerances, so that their use has heretofore been restricted to use in apparatus such as non-positive displacement, centrifugal pumps wherein the pump is immersed in the melt and is lubricated by the melt.

An object of this invention is the provision of a positive displacement pumping or metering apparatus for molten metals wherein ceramic material is utilized as a material of construction and provides a method and means for metering molten metal with apparatus comprising molded ceramic material wherein integrity in the gas and liquid seals between sliding parts of the apparatus is obtained.

Another object of the invention is the provision of a positive piston displacement pump or metering device which does not require machining or precision tolerances between its pumping or metering parts but prevents leakage around its metering parts during metering or pumping operations thereof.

A further object is the provision of a positive displacement metering or pumping device for molten metals comprising metering parts composed of molded ceramic material, and automatic gaseous pressure control means for preventing leakage of gas into the molten metal being metered or pumped, around the metering parts of the device.

Another object of the invention comprises the provision of a molten metal metering container having a metering piston movable therein for metering the metal delivered from the container, in which the periphery of the piston is disposed in spaced relation to the inner wall of the container, and the provision of fluid relative pressure supply means for supplying relative fluid pressure into the container at the side of the metering piston opposite from its molten metal contacting side, including electrical contact means carried by the piston to be closed or opened by the level of the molten metal in the container between the periphery of the piston and the inner wall of the container traversed by the piston, for automatically controlling the relative pressure in the container at the aforesaid opposite side of the piston to balance the relative pressure of the molten metal against the piston tending to pass the periphery of the piston during relative metering movement of the piston, when metering molten metal from the container.

Other objects and advantages of the invention will become apparent from the following description and accompanying drawings in which like reference characters refer to like parts in the several figures.

Figure 1:
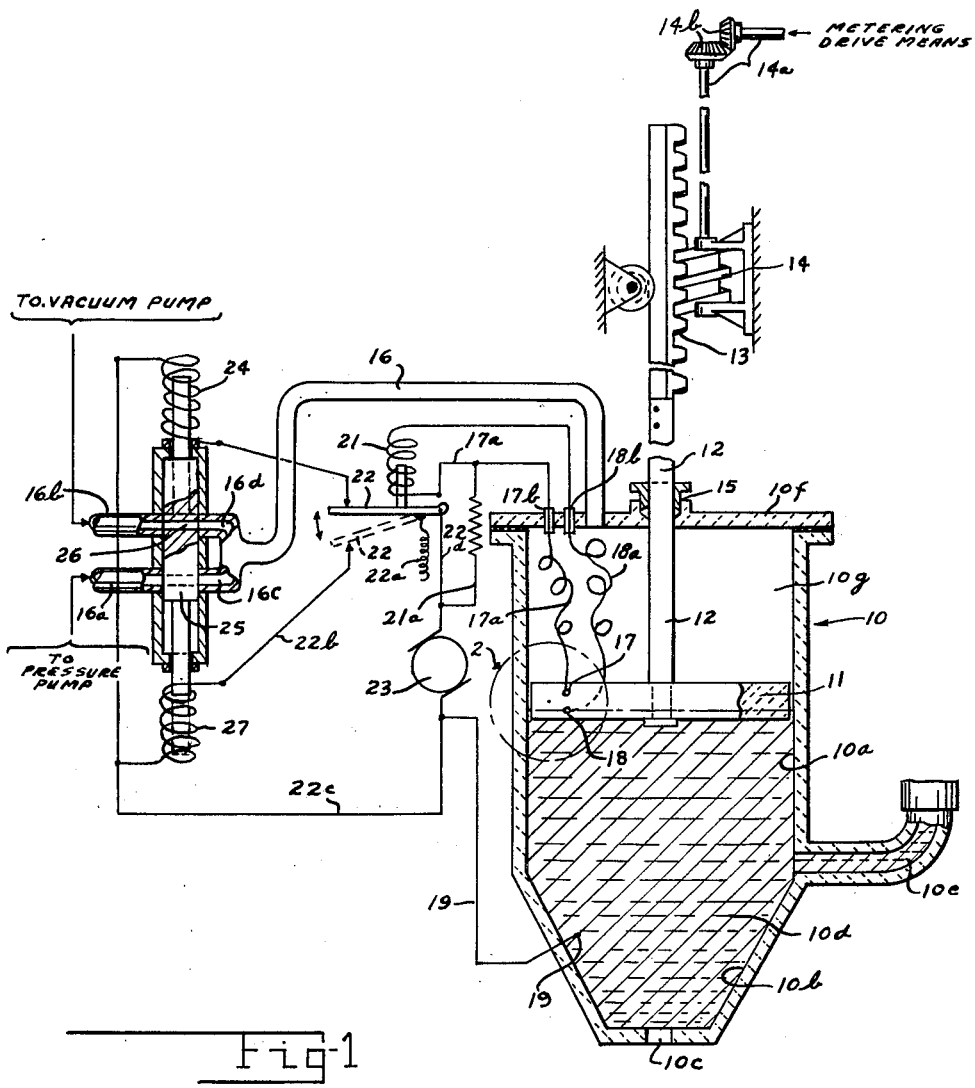
FIGURE 1 is a schematic vertical sectional view through a metering device incorporating the invention, certain parts thereof being shown in elevation.

Referring to FIGURE 1 more particularly the reference numeral 10 denotes a cylindrical container formed or molded of a ceramic composition, such as boron nitride or silicon nitride bonded silicon carbide, having a cylindrical inner surface 10a and tapering from its lower end at 10b and having a metal metering discharge opening at 10c for discharge of metered quantities of molten metal, such as molten aluminum, indicated at 10d. The melt 10d may be introduced into the container or receptacle 10 by or through any suitable means, such as a valved supply conduit 10e. The top of the container 10 is closed by a suitable closure 10f.

The cylinder or container 10 is fitted with a metering piston member 11 for traversing the inner cylindrical portion 10a, the piston being preferably made of molded ceramic material similar to that of the container with a fit between the piston 11 and the cylinder 10 which is sufficiently loose to prevent a gas seal from being provided between the piston 11 and the cylinder wall 10a. This permits the cylinder and piston to be molded without the necessity of machining.

The metering piston 11 is advanced or retracted in the cylinder 10 by an attached piston rod 12, the upper portion of the piston rod being provided with a rack member portion 13 which is biased and longitudinally moved by a meshing worm member 14. The worm 14 may be rotated by any suitable "metering" drive means, such as the shafts 14a and gears 14b, driven by suitable adjusting means (not shown).

A sliding seal 15 of conventional construction is provided in the center of the top 10f of the metering container or receptacle 10 through which the piston rod 12 moves in sealed relation.

A tube or conduit 16 in communication with the interior of the cylinder 10, above the piston member 11, is provided for maintaining a partial vacuum or balancing pressure in the cylinder above the piston 11, or if the melt 10d is metered under a substantially greater than atmospheric pressure a positive pressure may be maintained in the air chamber 10g above the piston 11, the desired result being to balance the static forces on either side of the piston, thereby preventing air or pressure above the piston from bypassing around the periphery of the piston into the molten metal 10a in the portion of the cylinder below the piston, or to prevent the liquid melt from leaking upwardly between the piston and wall of the cylinder into the pressure (or partial vacuum) chamber 10j above the piston.

Controlled presure in the cylinder 10 above the piston may be provided by a conventional air compressor (not shown), having a pressure delivery pipe 16a, or by a suitable vacuum pump (not shown) having a suction conduit 16b, due to the position of an axially shiftable control valve 25 having a passage 26, the valve 25 being shiftable by solenoids 24 or 27 to register the passage with the vacuum pump conduit 16b, or with the pressure pump conduit 16a, respectively.

The pipe or conduit 16 is provided with branch conduits 16c and 16d which connect the valve casing 25a in alignment with the conduits 16a and 16b, respectively, so that communication is established through the passage or opening 26 between the pressure supply conduit 16a and bifurcated end portion 16c when the valve 25 is drawn down by solenoid 27 (as shown in dotted lines), or to establish communication between the suction conduit 16b and the other bifurcated end 16d when the valve 25 is raised (as shown in full lines) by the solenoid 24.

The peripheral face or edge of the metering piston 11 carries upper and lower spaced and relatively insulated electrical contacts 17 and 18 having flexible extensible leads or "pigtail" wires 17a and 18a leading upwardly therefrom through suitably sealed (and insulated) plugs or openings 17b and 18b in the top 10f of the molten metal container or receptacle 10 to the exterior, substantially as shown in FIGURE 1.

Figure 2:
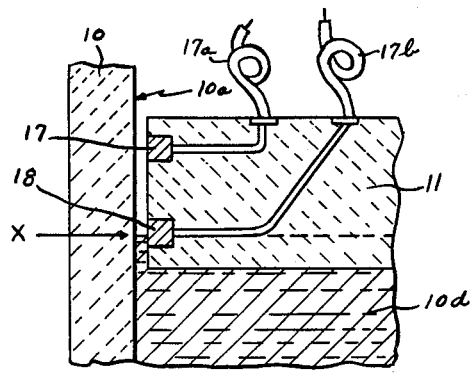
FIGURE 2 is an enlarged vertical sectional view through the portion of the device shown in FIGURE 1, enclosed in the circle indicated at 2, illustrating the liquid level of the melt in contact with the lower contact terminal on the periphery of the metering piston.

The operation of the air pressure supply means and the vacuum or suction supply means is controlled by the level X of the molten metal in the cylinder 10 and the contact of the molten metal with the contacts 17 and 18. As shown in FIGURE 2, and indicated by the arrow X, the surface of the liquid metal is in electrical contact with the lower contact member 18, while FIGURE 2 illustrates the liquid metal in contact with both contacts 18 and 17, the molten metal level here being indicated by the arrow X'.

The provision of only one of the limit switch contacts 17 and 18 will provide for continual "hunting and seeking" in the control means, a condition which is not ideal, but it will be apparent that various different control arrangements may be provided by a person ordinarily skilled in the art, and that the detailed embodiment shown herein should not be considered as limiting the invention.

Figure 3:
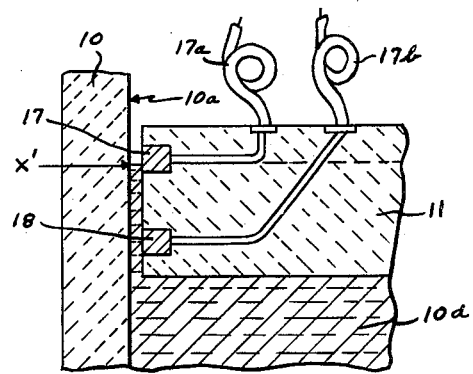
FIGURE 3 is a somewhat similar view, but showing the level of the metallic melt between the periphery of the piston and the container wall at a higher level in contact with both of the electrical contact terminals on the metering piston.

Contacts 17 and 18 are wired by the circuit wires 17a and 18a to a switching relay 21 which controls the position of a switch 22 in the circuit comprising a generator 23 and wire 19. When the level of the molten metal in cylinder 10 rises to contact the contact 17 the relay 21 is deenergized by a shunt circuit including the wire 21a and the relay 21 being deenergized, the switch 22 is pulled downwardly by a tension spring 22a, thus breaking the energizing circuit to the solenoid 24 and closing a circuit through contact 19 and wire 22b to the lower solenoid 27, through wire 22c, generator 23, and wire 22d, to move the control valve 25 downwardly and admit pressure or admit atmosphere, as the case may be, from the conduit 16a, through passages 26, 16c and 16 into the upper portion of the cylinder to pressurize the chamber 10g and surface of the liquid metal, and force the liquid level downwardly from the level shown in FIGURE 3 toward the level shown in FIGURE 2.

It should be noted that where the metering displacement of the liquid metal from the cylinder 10 is at, or substantially at atmospheric pressure the conduit 16a, formally indicated as being connected to a pressure pump, could and would be open to atmosphere, since when the suction (partial vacuum) is relieved when the circuit from the contact 17 "shunts out" the relay 21 and atmosphere then enters the chamber 10g through pipe 16, the level of the metal melt would drop by gravity until the level drops below the contact 17 where it breaks the shunt circuit and re-energizing solenoid 24 to the position shown in full lines in FIGURE 1. The circuits are completed by the conductor wire 19 leading from the generator terminal through the lower wall portion 10b into electrical contact with the molten metal and through the molten metal to the contact 18, or contacts 17 and 18 (as seen in FIGURES 1 and 2, respectively).

As before mentioned the container 10 and piston 11 are molded of hard durable ceramic material, such as boron nitride or silicon nitride bonded silicon carbide, and since machining is impracticable with such materials these parts must be molded with ample clearance between the wall of the container and the periphery of the piston. Therefore the clearance tolerances are not close enough to provide a gas or fluid tight cooperative seal therebetween. Ceramic materials, or graphite are not wetted by molten metal so that a coinductive film of the metered or pumped molten metal does not coat or freeze on the materials and provides a closed conductive path after the level of the molten metal drops in the cylinder.

It may be desirable to externally heat the cylindrical container or receptacle to prevent the solidification of the molten metal therein, but such means is not shown herein.

Other means may be provided for controlling air pressure in the cylinder, within the purview of the invention and if it is desired to only admit subatmospheric air pressure to the cylinder the electrical circuitry shown could be simplified, to provide a single on-off relay for valving a vacuum pump to the cylinder.

While in the foregoing there has been shown one embodiment of the invention, for exemplary purpose it is to be understood that changes in details of construction, combination and arrangement of the parts may be resorted to without departing from the spirit and scope of the invention as defined in the following claims.

I claim:

1. A metering device for metering molten metal comprising a vertical cylindrical receptacle, a cylindrical metering piston member movable axially in said cylindrical receptacle in spaced relation to the inner wall thereof, metering means for moving said piston axially to meter molten metal from said receptacle below said piston, vertically spaced upper and lower electrical contact means carried by said piston within the planes of the upper and lower surfaces of the piston, adapted to be contacted by the molten metal, respectively when the level of the molten metal rises toward the plane of the upper surface of the piston, and when the molten metal level moves downwardly toward the plane of the lower surface of the piston, balancing pressure supply means responsive to contact of the molten metal with said upper contact means for supplying a balancing pressure into said receptacle above said piston on the surface of the molten metal for preventing the level of the molten metal in said receptacle from rising above the said upper contact means, including means responsive to contact of the molten metal in said receptacle with said lower contact means only for supplying relative lower pressure in the receptacle above said metering piston and molten metal for causing the molten metal in the receptacle to rise, relative to the piston, toward contacting relation with said upper contact means.

2. A device for metering molten metal such as aluminum comprising, a molded ceramic non-machinable cylindrical closed container having a molten metal discharge outlet in its lower portion, a molded ceramic non-machinable metering piston loosely fitting the interior wall of the container and movable axially downward for metering a molten metal from said container below said piston, metering piston actuating means connecting to said piston for advancing said piston downwardly to meter molten metal below said piston out of said container, vertically spaced upper and lower electrical contact means fixed to said piston in the periphery thereof adapted to be selectively closed by the molten metal rising between the periphery of the piston and wall of the container during a metering operation, a variable pressure supply conduit in communication at one end with the interior of said container above said piston, valve means connected to said conduit, movable to a first position for supplying a positive pressure to said conduit, and movable to a second position for applying a relative negative pressure in said conduit, separate means connected to said valve means for supplying positive and applying relative negative pressures to the valve means, first solenoid means for shifting said valve means to said first position when energized, second solenoid means for shifting said valve means to said second position when energized, an energizing circuit including relay switch means movable to a first position when de-energized for energizing said first solenoid means and movable to a second position when energized for energizing said second solenoid means, spring means for biasing said relay switch means to said first position when de-energized for energizing said first solenoid means for supplying a positive relative pressure to said container above said piston, means for energizing said relay switch means for energizing said second solenoid means, including an energizing circuit having one contact terminal in contact with molten metal when contained in the container, and a second terminal connected to said lower electrical contact means fixed in said piston to be closed by the rise of the molten metal between the periphery of the piston and the wall of the container, and circuit shunting means connected to said upper contact means and said relay switch means for shunting out the energizing circuit thereof by contact of said molten metal with said upper contact means.

3. A dispensing device for dispensing molten metal comprising a closed molded cylindrical non-electroconductive receptacle, a molded non-electroconductive piston movable axially in said cylinder in spaced non-contacting relation to the inner wall of the cylindrical receptacle, piston rod means extending upwardly in sealed slidable relation through the top of said receptacle for advancing said piston downwardly toward the bottom of said receptacle, said receptacle adapted to contain a batch of molten metal and having a restrictive molten metal outlet below said piston for discharge of molten metal from said receptacle, a positive pressure source, a separate relatively negative pressure source, conduit means for selectively connecting said positive and relatively negative pressure sources in communication with the interior of said receptacle above said piston including shiftable valve means, means responsive to relative rise in the level of molten metal in said receptacle to a predetermined level below the plane of the upper surface of said piston for shifting said valve means to connect said positive pressure source to said receptacle for preventing further relative rise of the molten metal above said plane, and means responsive to a relative drop in the level of said molten metal in said container below a predetermined level between the first mentioned predeterminel level and the plane of the bottom surface of said piston for shifting said valve means to disconnect said positive pressure source from said receptacle and connect said relative negative pressure source to said receptacle to arrest the relative drop in the level of the molten metal in said receptacle, relative to said plane of the lower surface of said piston.

4. A device for metering molten metal comprising a molded non-metallic cylindrical receptacle, a molded non-metallic metering piston axially movable in the receptacle in spaced relation to the inner wall of the receptacle, positive pressure supply means for supplying a positive pressure into said receptacle above said piston for preventing rise in the level of the molten metal in the receptacle above said piston during metering movement of said piston, relative lower pressure supply means for supplying a relative lower pressure in said receptacle on the surface of the molten metal being metered by said piston for permitting a relative rise in the level of said molten metal relative to said piston, upper contact means carried by said piston including an energizing circuit adapted to be closed by contact of said molten metal with said upper contact means for connecting said positive pressure supply means with said receptacle to prevent further rise of the molten metal therein relative to said piston, and lower contact means carried by said piston adapted to be closed by the level of the molten metal relative to the piston when said level drops below said upper contact means, including an energizing circuit closed through said lower contact means and the molten metal in the receptacle for connecting the relative lower pressure supply means to the receptacle to arrest further drop in the level of the molten metal relative to the piston, during metering movement of the piston in the receptacle.

5. A molten metal dispensing device comprising a closed vertical non-metallic molded receptacle adapted to contain a melt of molten metal, a molded non-metallic piston loosely fitting the inner wall of the receptacle, means for advancing said piston axially downward for dispensing molten metal from said receptacle through a delivery opening in the lower portion thereof, a fixed electrical contact in the lower portion of said receptacle adapted to make electrical contact with molten metal when contained in said receptacle, vertically spaced lower and upper electrical contacts in said piston between the planes of the upper and lower surfaces of said piston, said lower contact disposed for electrical contact with the molten metal when the level thereof is at a lower predetermined level between the upper and lower surfaces of said piston, said upper contact disposed for electrical contact with said molten metal simultaneously with said lower contact when the level of the molten metal reaches an upper predetermined level between the upper and lower surfaces of said piston, relay switch means including an energizing circuit therefor connected to said fixed electrical contact and said lower contact for energizing said relay through the molten metal, a shunt circuit connected to said upper contact and said energizing circuit for de-energizing said relay switch means when the molten metal in the receptacle contacts the upper contact, a positive pressure source, a negative pressure source, a pressure supply conduit in communication with the interior of said receptacle above said piston, shiftable valve means for selectively connecting said conduit with said positive pressure source or with said negative pressure source, solenoid means for shifting said shiftable valve means when said switch relay is energized to establish communication between said negative pressure source and said conduit, second solenoid means for shifting said valve means when said relay is de-energized to establish communication between said positive pressure source and the conduit, and resilient means for biasing said relay switch means toward its de-energized position.

6. In a molten metal metering pump device, a molded ceramic vertical cylindrical receptacle adapted to contain molten metal, a molded ceramic piston loosely fitting said receptacle for axial dispensing movement therein, first contact means carried by said piston including an energizing circuit closed by contact thereof with the molten metal for supplying suction pressure to said receptacle above said piston during dispensing movement thereof to maintain the level of said molten metal above the lower surface of the piston in contact with said first contact means, a second contact carried by said piston above the first contact to be closed by molten metal in said receptacle incident to a predetermined rise in the level thereof above said first contact, including circuit means closed by contact of said molten metal with said second contact for interrupting said last-mentioned communication with the the suction pressure supply means and admitting a positive pressure in said receptacle above said piston to prevent further rise of said molten metal relative to said piston, during dispensing of molten metal from said receptacle by said piston.

References Cited in the file of this patent
UNITED STATES PATENTS
2,992,618     Means _____ July 18, 1961
FOREIGN PATENTS
334,981     Italy _____ Jan. 31, 1936